United States Patent
Chung et al.

(10) Patent No.: US 9,991,790 B2
(45) Date of Patent: Jun. 5, 2018

(54) CURRENT CONTROL CIRCUIT

(71) Applicant: City University of Hong Kong, Kowloon (HK)

(72) Inventors: Shu Hung Henry Chung, Mid-levels (HK); Kuen Faat Yuen, New Territories (HK); Wing To Fan, New Territories (HK)

(73) Assignee: City University of Hong Kong, Kowloon (HK)

( * ) Notice: Subject to any disclaimer, the term of this patent is extended or adjusted under 35 U.S.C. 154(b) by 0 days. days.

(21) Appl. No.: 14/305,302

(22) Filed: Jun. 16, 2014

(65) Prior Publication Data

US 2015/0362933 A1  Dec. 17, 2015

(51) Int. Cl.
| | |
|---|---|
| *H02M 3/156* | (2006.01) |
| *G05F 1/59* | (2006.01) |
| *H02M 3/158* | (2006.01) |
| *G05F 1/56* | (2006.01) |
| *G05F 1/46* | (2006.01) |
| *H02M 1/00* | (2006.01) |

(52) U.S. Cl.
CPC ............ *H02M 3/156* (2013.01); *G05F 1/462* (2013.01); *G05F 1/59* (2013.01); *H02M 3/158* (2013.01); *G05F 1/461* (2013.01); *G05F 1/56* (2013.01); *H02M 2001/0009* (2013.01); *H02M 2001/0045* (2013.01); *H02M 2001/0087* (2013.01)

(58) Field of Classification Search
CPC . H02M 2001/0045; H02M 2001/0087; H02M 3/156; H02M 3/158; G05F 1/462; G05F 1/563; G05F 1/565; G05F 1/59
See application file for complete search history.

(56) References Cited

U.S. PATENT DOCUMENTS

| | | | | |
|---|---|---|---|---|
| 5,132,893 A * | 7/1992 | Klein | ...................... | G05F 1/563 323/901 |
| 5,592,072 A * | 1/1997 | Brown | ...................... | G05F 1/62 323/268 |
| 6,724,175 B1 * | 4/2004 | Matsuda | ............... | H02M 3/156 323/224 |
| 6,867,644 B2 * | 3/2005 | Taubman | .................. | H03F 3/08 327/562 |
| 7,498,778 B2 * | 3/2009 | Seiersen | ................... | H02J 1/10 323/269 |
| 2003/0006717 A1 * | 1/2003 | Roller | ................ | H05B 33/0812 315/219 |
| 2007/0120506 A1 * | 5/2007 | Grant | ................. | H05B 33/0851 315/312 |
| 2008/0055940 A1 * | 3/2008 | Lawson | .................. | H02M 1/10 363/16 |
| 2009/0187925 A1 * | 7/2009 | Hu | ..................... | H05B 33/0815 719/327 |

(Continued)

*Primary Examiner* — Fred E Finch, III
(74) *Attorney, Agent, or Firm* — Renner Kenner Greive Bobak Taylor & Weber (57) ABSTRACT

A current control apparatus arranged to regulate an electric current flowing between a load and an external electric circuit includes a current control loop having a current regulator arranged to manipulate an amount of the electric current flowing between the load and the external electric circuit; and a voltage control loop having a voltage regulator arranged to manipulate a voltage across the current regulator.

12 Claims, 10 Drawing Sheets

(56) References Cited

U.S. PATENT DOCUMENTS

| | | | | |
|---|---|---|---|---|
| 2009/0189539 A1* | 7/2009 | Deng | ................ | H05B 33/0812 |
| | | | | 315/294 |
| 2010/0309690 A1* | 12/2010 | Kawabe | ............ | H02M 3/33507 |
| | | | | 363/21.01 |
| 2010/0329293 A1* | 12/2010 | Taubman | ............... | B82Y 20/00 |
| | | | | 372/38.02 |
| 2011/0062872 A1* | 3/2011 | Jin | .................... | H05B 33/0818 |
| | | | | 315/122 |
| 2011/0121653 A1* | 5/2011 | Hartular | ................... | H02J 1/10 |
| | | | | 307/66 |
| 2011/0201281 A1* | 8/2011 | Bakalski | ................. | H04B 1/48 |
| | | | | 455/73 |
| 2012/0068626 A1* | 3/2012 | Lekatsas | ............ | H05B 33/0815 |
| | | | | 315/307 |
| 2012/0081016 A1* | 4/2012 | Wu | ................... | H05B 33/0827 |
| | | | | 315/192 |
| 2013/0119874 A1* | 5/2013 | Zhang | ................... | H05B 37/02 |
| | | | | 315/186 |
| 2014/0225585 A1* | 8/2014 | Buthker | ............... | H02M 3/156 |
| | | | | 323/285 |
| 2016/0048149 A1* | 2/2016 | Davidson | ............... | H01H 9/547 |
| | | | | 323/312 |

* cited by examiner

CURRENT CONTROL CIRCUIT

TECHNICAL FIELD

The present invention relates to a current control apparatus and particularly, although not exclusively, to a lossless active current source and/or current sink.

BACKGROUND

Current control circuits are often arranged between a current source and an electric circuit for absorbing electric current from the electric circuit or for delivering electric current to the electric circuit. Ideally, the current control circuits are operable to regulate current between the current source and the electric circuit, giving high dynamic response, low noise, and high energy efficient current control.

Currently, these current control circuits either utilize a linear type series-pass device or a switched-mode power supply for current control.

Linear type series pass devices can generally provide fast dynamic response, small output ripple current and low output noise, and they do not require output filters. However, series pass devices suffer from low energy efficiency and lower power density. In addition, series pass devices only allows for unidirectional power flow, which may not be ideal in bidirectional operations.

On the other hand, switched-mode power supplies are usually energy efficient with high power density, and the same circuit can be used as both a current source and a current sink as they allow for bidirectional operation. However, switched-mode power supplies provide slow dynamic response, large output ripple current and high switching noise. Large output filter is also often required.

It is an object of the invention to address this need or, more generally, to provide an improved current control apparatus for regulating electric current between a current source and an electric circuit.

SUMMARY OF THE INVENTION

In accordance with a first aspect of the present invention, there is provided a current control apparatus arranged to regulate an electric current flowing between a load and an external electric circuit, comprising: a current control loop having a current regulator arranged to manipulate an amount of the electric current flowing between the load and the external electric circuit; and a voltage control loop having a voltage regulator arranged to manipulate a voltage across the current regulator.

In one embodiment of the first aspect, the voltage control loop is arranged to manipulate the voltage across the current regulator so as to minimize the voltage across the current regulator.

In one embodiment of the first aspect, the current control apparatus is arranged to regulate the amount of electric current transferred from the load to the external electric circuit or from the external electric circuit to the load.

In one embodiment of the first aspect, the current control loop is arranged to manipulate the electric current flowing between the load and the external electric circuit so as to substantially match the amount of the electric current to a predetermined current value.

In one embodiment of the first aspect, the current control loop further comprises: a current detector arranged to detect the amount of the electric current flowing between the load and the external electric circuit; and a current controller arranged to compare the detected amount of the electric current with the predetermined current value and to output a control signal to the current regulator to manipulate an output current of the current regulator so as to manipulate the electric current flowing between the load and the external electric circuit to substantially match the amount of electric current to the predetermined current value.

In one embodiment of the first aspect, the voltage control loop is arranged to manipulate the voltage across the current regulator so as to substantially match the voltage across the current regulator to a predetermined voltage value.

In one embodiment of the first aspect, the voltage control loop further comprises: a voltage sensor arranged to detect the voltage across the current regulator; and a voltage controller arranged to compare the detected voltage across the current regulator with a predetermined voltage value and to output a control signal to the voltage regulator to manipulate an output voltage of the voltage regulator so as to manipulate the voltage across the current regulator to substantially match the voltage with the predetermined voltage value.

In one embodiment of the first aspect, the output voltage of the voltage regulator is manipulated to substantially match a voltage across the external electric circuit.

In one embodiment of the first aspect, the current regulator comprises a linear type series pass device.

In one embodiment of the first aspect, the current regulator comprises a bipolar junction transistor.

In one embodiment of the first aspect, the electric current flowing between the load and the external electric circuit is the collector current of the bipolar junction transistor.

In one embodiment of the first aspect, the current controller is arranged to control an amount of a base current of the bipolar junction transistor so as to manipulate an amount of the collector current of the bipolar junction transistor.

In one embodiment of the first aspect, the current controller comprises a proportional-plus-integral (PI) controller.

In one embodiment of the first aspect, the voltage regulator comprises a switched-mode voltage converter.

In one embodiment of the first aspect, the voltage detector is arranged to detect a collector-emitter voltage of the bipolar junction transistor; and the voltage controller is arranged manipulate an output voltage of the switched-mode voltage converter so as to minimize the collector-emitter voltage of the bipolar junction transistor.

In one embodiment of the first aspect, the switched-mode voltage converter comprises a buck converter having a MOSFET switch for controlling the collector-emitter voltage of the bipolar junction transistor.

In one embodiment of the first aspect, the load comprises a battery or a resistive component.

In one embodiment of the first aspect, the current control apparatus is arranged to regulate both the amount of electric current transferred from the load to the external electric circuit and the amount of electric current transferred from the external electric circuit to the load.

In one embodiment of the first aspect, the voltage regulator comprises a bi-directional switched-mode voltage converter.

In one embodiment of the first aspect, the current regulator comprises two unidirectional series pass devices connected in parallel, each of the unidirectional series pass device being arranged to enable current flow in one direction.

In one embodiment of the first aspect, the voltage sensor is arranged to detect the voltage across the two unidirectional series pass devices.

In one embodiment of the first aspect, the two unidirectional series pass devices are bipolar junction transistors.

In accordance with a second aspect of the present invention, there is provided a current source control apparatus arranged to regulate an electric current delivered from a power source to an external electric circuit, comprising: a current control loop having a bipolar junction transistor arranged to manipulate an amount of the electric current flowing from the power source to the external electric circuit; and a voltage control loop having a switched-mode voltage converter arranged to manipulate a voltage across the bipolar junction transistor so as to minimize the voltage across the current regulator.

In one embodiment of the second aspect, the current control loop further comprises: a current detector arranged to detect the amount of electric current flowing from the power source to the external electric circuit; and a current controller arranged to compare the detected amount of the electric current with a predetermined current value and to output a control signal to the bipolar junction transistor to manipulate an output current of the bipolar junction transistor so as to manipulate the electric current flowing from the power source to the external electric circuit to substantially match the amount of the electric current to the predetermined current value.

In one embodiment of the second aspect, the voltage control loop further comprises: a voltage sensor arranged to detect the voltage across the current regulator; and a voltage controller arranged to compare the detected voltage across the bipolar junction transistor with a predetermined voltage value and to output a control signal to the switched-mode voltage converter to manipulate an output voltage of the switched-mode voltage converter so as to manipulate the voltage across the bipolar junction transistor to substantially match the voltage with the predetermined voltage value.

In accordance with a third aspect of the present invention, there is provided a current sink control apparatus arranged to regulate an electric current delivered from an external electric circuit to a load, comprising: a current control loop having a bipolar junction transistor arranged to manipulate an amount of the electric current flowing from the external electric circuit to the load; and a voltage control loop with a switched-mode voltage converter arranged to manipulate a voltage across the bipolar junction transistor so as to minimize the voltage across the bipolar junction transistor.

In one embodiment of the third aspect, the current control loop further comprises: a current detector arranged to detect the amount of electric current flowing from the external electric circuit to the load; and a current controller arranged to compare the detected amount of the electric current with a predetermined current value and to output a control signal to the bipolar junction transistor to manipulate an output current of the bipolar junction transistor so as to manipulate the electric current flowing from the external electric circuit to the load to substantially match the amount of the electric current to the predetermined current value.

In one embodiment of the third aspect, the voltage control loop further comprises: a voltage sensor arranged to detect the voltage across the bipolar junction transistor; and a voltage controller arranged to compare the detected voltage across the bipolar junction transistor with a predetermined voltage value and to output a control signal to the switched-mode voltage converter to manipulate an output voltage of the switched-mode voltage converter so as to manipulate the voltage across the bipolar junction transistor to substantially match the voltage with the predetermined voltage value.

In one embodiment of the third aspect, the load comprises a battery or a resistive component.

In accordance with a fourth aspect of the present invention, there is provided a bidirectional current control apparatus arranged to manipulate an electric current delivered from an external electric circuit to a load or from a load to an external electric circuit, comprising: a current control loop having two bipolar junction transistors connected in parallel and each arranged to enable current flow in one direction, the bipolar junction transistors are arranged to manipulate an amount of the electric current flowing from the external electric circuit to the load or from the load to the external electric circuit; and a voltage control loop having a switched-mode voltage converter arranged to manipulate a voltage across at least one of the bipolar junction transistor so as to minimize the voltage across the at least one bipolar junction transistor.

BRIEF DESCRIPTION OF THE DRAWINGS

Embodiments of the present invention will now be described, by way of example, with reference to the accompanying drawings in which.

DETAILED DESCRIPTION OF THE INVENTION

Figure 1A:
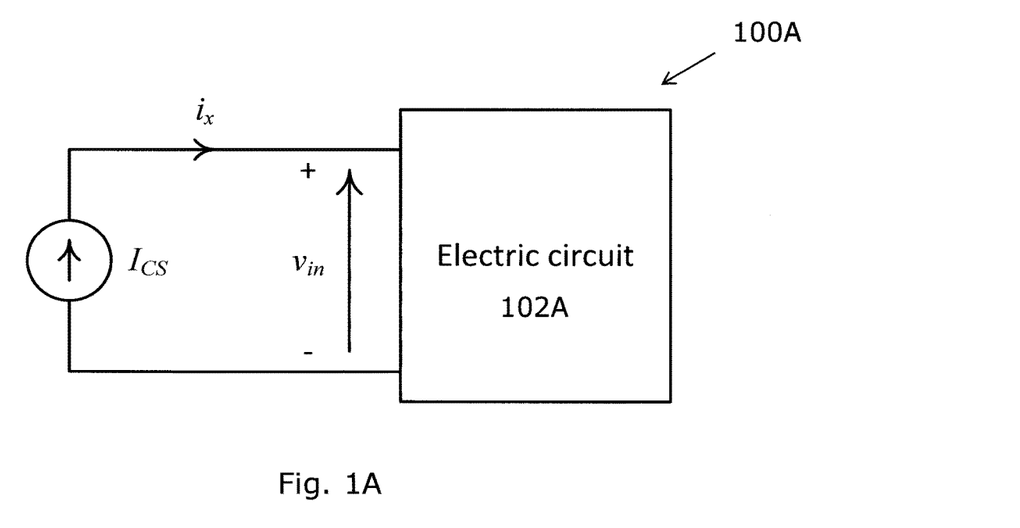
FIG. 1A is a circuit diagram illustrating a basic current source.

FIG. 1A shows the circuit 100A of a basic current source $I_{CS}$. In FIG. 1A, the current source $I_{CS}$ is arranged to deliver electric current $i_x$ to an electric circuit 102A, independent of the voltage $v_{in}$ across the current source $I_{CS}$.

Figure 1B:
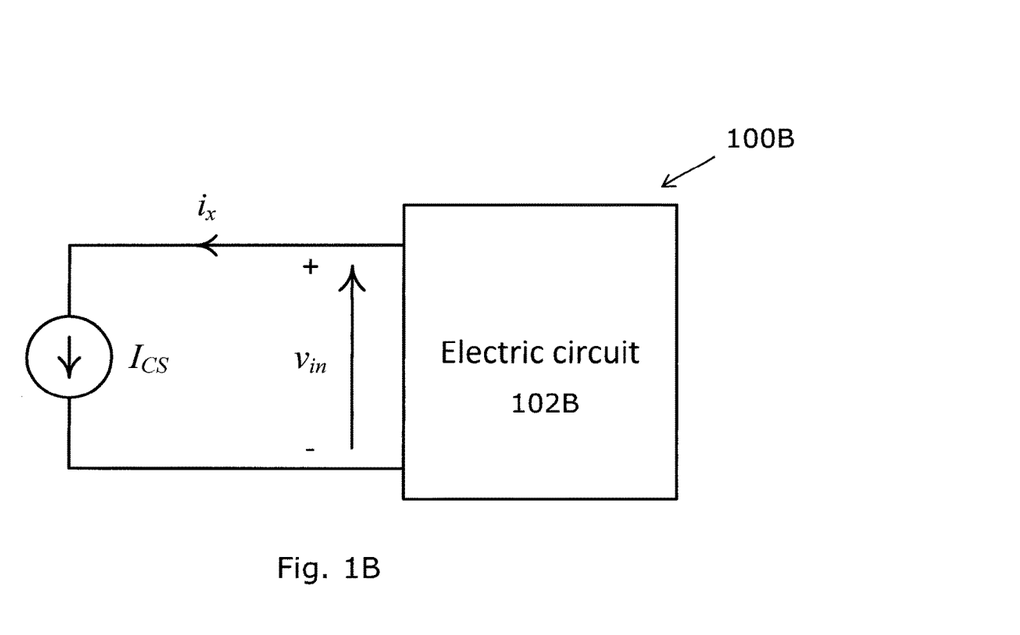
FIG. 1B is a circuit diagram illustrating a basic current sink.

FIG. 1B shows the circuit 100B of a basic current sink $I_{CS}$. In FIG. 1B, the current sink $I_{CS}$ is arranged to absorb electric current $i_x$ from an electric circuit 102B, independent of the voltage $v_{in}$ across the current source $I_{CS}$.

Figure 2:
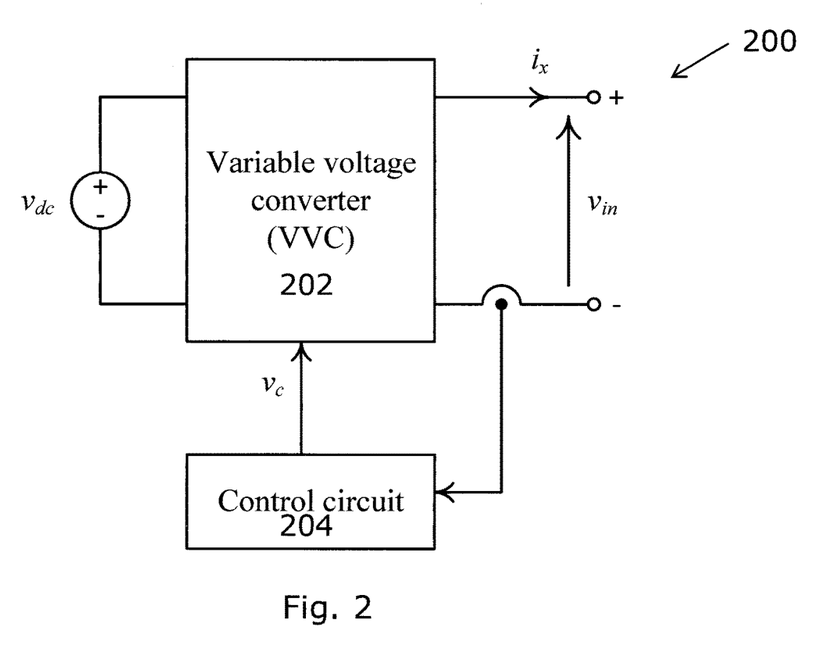
FIG. 2 is a circuit diagram showing a variable voltage converter and an associated control circuit that are used as a current regulator for realizing the current source $I_{CS}$ of FIG. 1A.

FIG. 2 shows a variable voltage converter (VVC) 202 and an associated control circuit 204 for realizing the current source $I_{CS}$ for delivering electrical energy to the external circuit 102A of FIG. 1A. As shown in FIG. 2, the variable voltage converter 202 is supplied by a voltage source $v_{dc}$. The output current $i_x$ is regulated by controlling the output voltage of the variable voltage converter 202. In operation, the control circuit 204 first senses the output current $i_x$ and then generates and outputs necessary command/signal to the variable voltage converter 202 to deliver the required voltage. Specifically, if the detected current $i_x$ is lower than the designed output current, the control circuit 204 will give command to the variable voltage converter 202 to deliver a higher output voltage so as to increase the output current $i_x$. Conversely, if the detected current $i_x$ is higher than the designed output current, the control circuit 204 will give command to the variable voltage converter 202 to deliver a lower output voltage so as to reduce the output current $i_x$.

Two major approaches are operable to implement the variable voltage converter 202 as shown in FIG. 2. The first approach is by using a series pass device to control the output current $i_x$ from the voltage source $v_{dc}$ whereas the second approach is based on using a switched-mode voltage converter to control the output current $i_x$.

Figure 3:
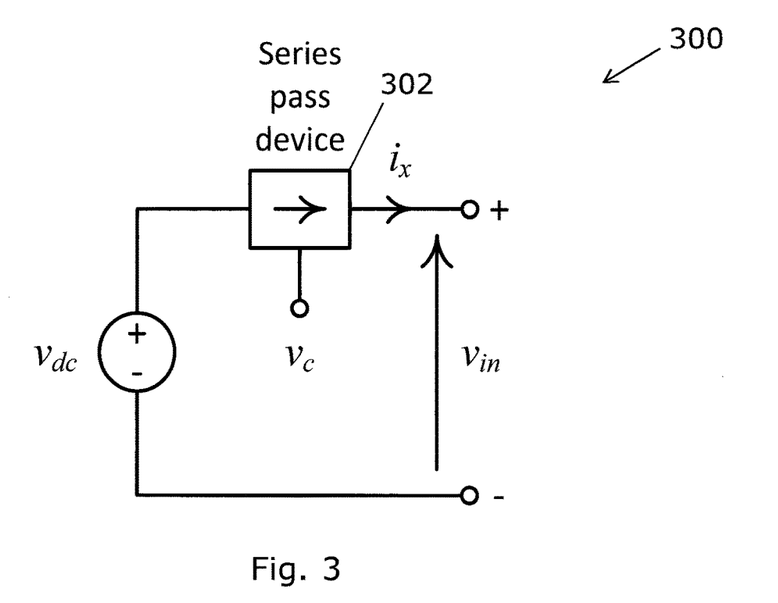
FIG. 3 is a circuit diagram showing a series pass device for implementing the current regulator of FIG. 2.

FIG. 3 shows a series pass device 302 for implementing the current regulator 200 of FIG. 2. Specifically, the variable voltage converter of FIG. 2 is realized by a series pass device 302 in FIG. 3, which is arranged to control the magnitude of the current through it with an external signal. As shown in FIG. 3, the series pass device 302 is connected in series with a voltage source $v_{dc}$. The current $i_x$ through the series pass device 302 can be controlled by the control signal $v_c$.

Figure 4:
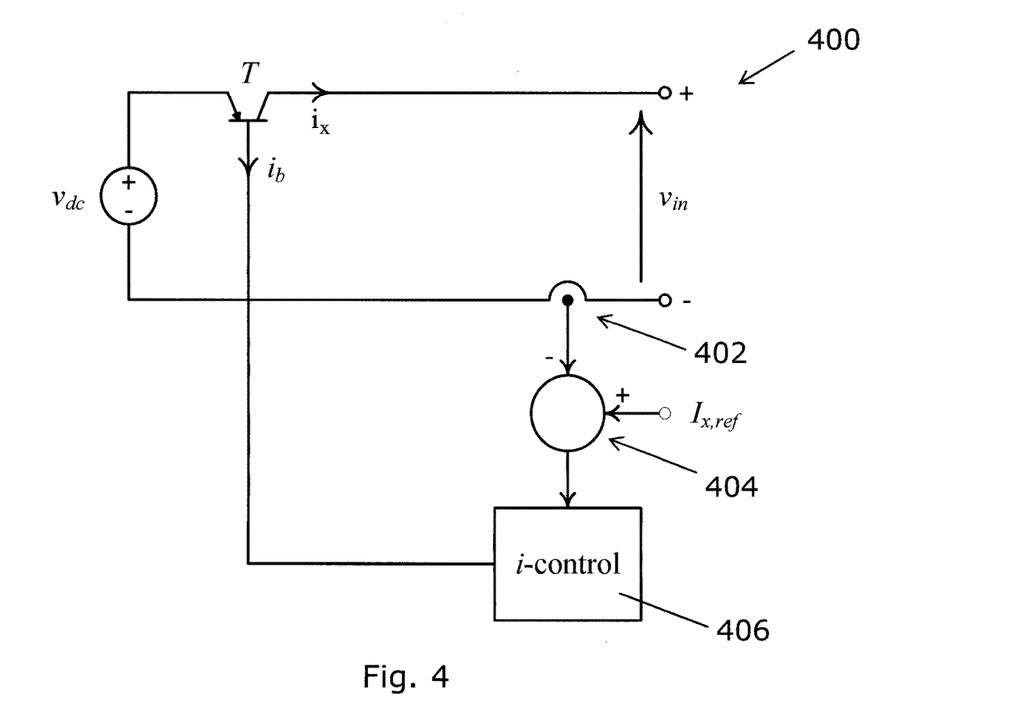
FIG. 4 is a circuit diagram showing the use of a bipolar junction transistor as the series pass device in FIG. 3.

FIG. 4 shows a bipolar junction transistor (BJT) used as an exemplary series pass device of FIG. 3. The bipolar junction transistor, labelled as T in FIG. 4, is arranged to operate in a linear mode, with its collector current $i_x$ dependent on its base current $i_b$ as $$i_x = \beta i_b \quad \text{(Equation 1)}$$

where $\beta$ is the current gain of the bipolar junction transistor T.

In order to regulate the output current $i_x$, a simple feedback mechanism is used, as shown in FIG. 4. Specifically, in operation, the source current $i_x$ is sensed by a current detector 402 and is then compared with a reference current $I_{x,ref}$ by a comparator 404. The difference between the sensed current $i_x$ and the reference current $I_{x,ref}$ is processed by a current controller "i-control" 406 to control the base current $i_b$, and hence the output current $i_x$ of the bipolar junction transistor T. In operation, if the output current $i_x$ is lower than the reference current $I_{x,ref}$, the controller 406 will increase the base current $i_b$ of the bipolar junction transistor T so as to increase the output current $i_x$. Conversely, if the output current $i_x$ is higher than the reference current $I_{x,ref}$, the controller 406 will reduce the base current $i_b$ of the bipolar junction transistor T so as to decrease the output current $i_x$. The overall effect of this current regulation by the current control loop is that the output current $i_x$ will be substantially the same as the reference current $I_{x,ref}$.

Figure 5:
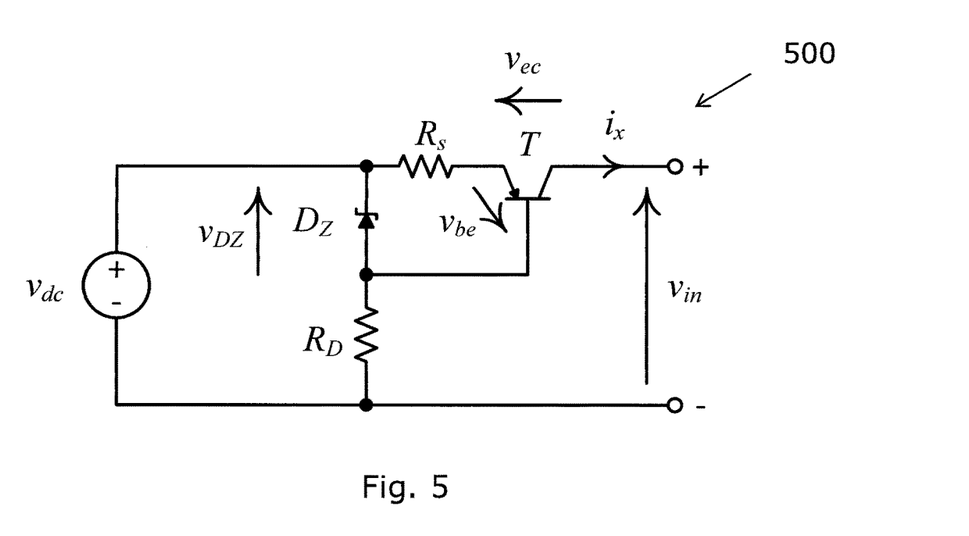
FIG. 5 is a circuit diagram showing the detailed circuit construction of the current regulator of FIG. 4.

FIG. 5 is a circuit diagram 500 showing the detailed circuit construction of the current regulator 400 of FIG. 4. In FIG. 5, the resistor $R_S$ is used to regulate the magnitude of the current $i_x$. Considering the voltage across the resistor $R_S$, the base-emitter voltage $v_{be}$ of the transistor T, and the zener voltage $v_{DZ}$ of the zener diode $D_Z$, the output current $i_x$ is given by $$i_x \approx \frac{v_{DZ} + v_{be}}{R_s} \quad \text{(Equation 2)}$$

In the above calculation, the collector current $i_x$ of the transistor T is assumed to be the same as the emitter current. It can be observed from Equation 2 that the collector current $i_x$ is determined mainly by the resistance of the resistor $R_S$, as the zener voltage $v_{DZ}$ of the zener diode $D_Z$ and the base-emitter voltage $v_{be}$ of the transistor T are relatively constant.

The major drawback of using a series pass device in the current regulator 500 for a current source as shown in FIG. 5 is that the power loss in the transistor T is large. As the emitter-collector voltage $V_{ec}$ of the transistor T is equal to the difference between the source voltage $v_{dc}$ and the voltage $v_{in}$ across the current source, which is given by, $$v_{ec} = v_{dc} - v_{in} \quad \text{(Equation 3)}$$

the power loss $P_{loss}$ in the transistor T is given by $$P_{loss} = v_{ec} i_x \quad \text{(Equation 4)}$$

which is related to the voltage $V_{ec}$ and the required output current $i_x$. Furthermore, for series pass device, it is necessary to ensure that the source voltage $v_{dc}$ must be of higher voltage than the voltage $v_{in}$ across the current source.

Figure 6:
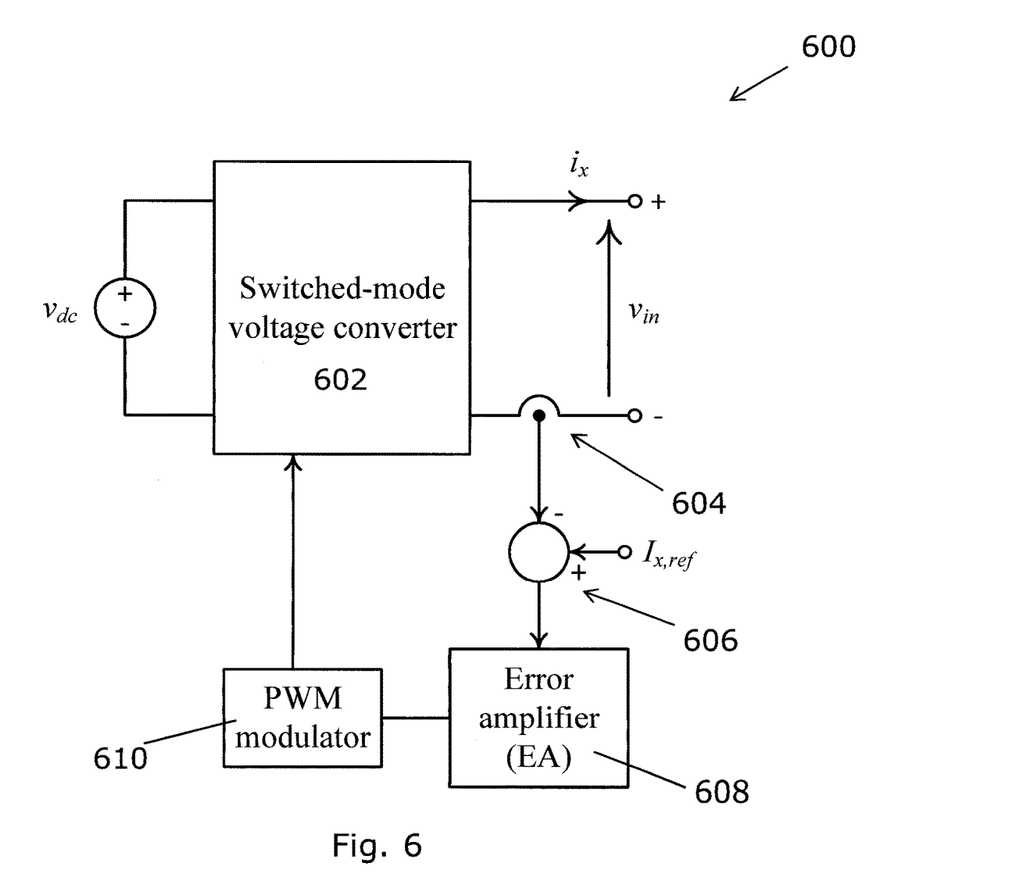
FIG. 6 is a circuit diagram showing a switched-mode voltage converter for realizing the current source $I_{CS}$ of FIG. 1A.

FIG. 6 shows a switched-mode voltage converter 602 for realizing the current source $I_{CS}$ of FIG. 1A. As illustrated in FIG. 6, in operation, the output current $i_x$ is first sensed by a current-sensing device 604, which may for example be a resistor, and is then compared with the reference current value $I_{x,ref}$ by a comparator 606. The error, which is the difference between the sensed output current $i_x$ and the reference current $I_{x,ref}$, is fed to an error amplifier EA 608. Next, the output of error amplifier 608 is sent to a pulse-width modulation (PWM) modulator 610 that gives the necessary command to the switching devices to alter/manipulate the control parameters such as the duty cycle or switching frequency in the power supply, so as to change the output voltage of the switched-mode voltage converter 602. Accordingly, the output current $i_x$ is effectively controlled.

Figure 7:
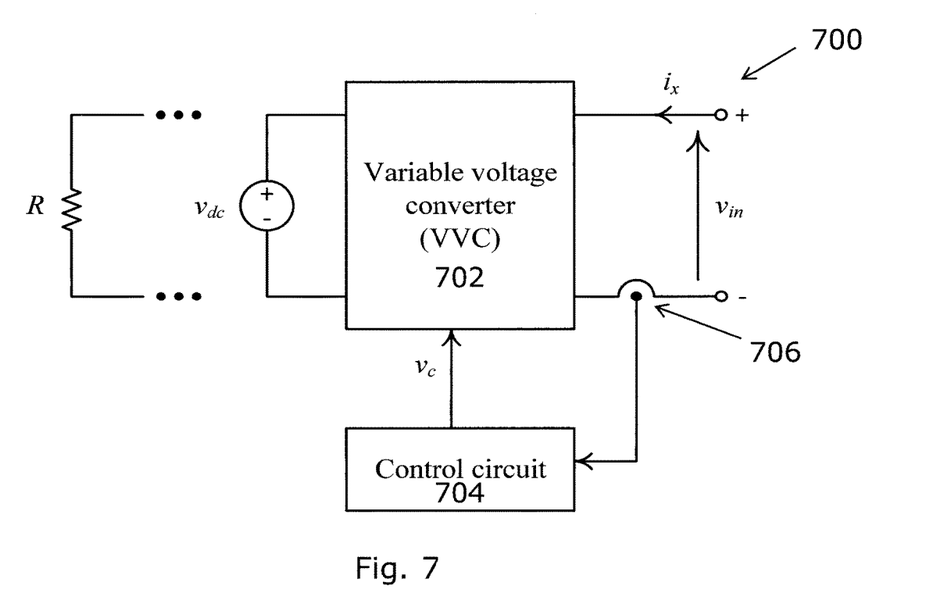
FIG. 7 is a circuit diagram showing a variable voltage converter and an associated control circuit that are used as a current regulator for realizing the current sink $I_{CS}$ of FIG. 1B.

FIG. 7 shows a variable voltage converter (VVC) 702 and an associated control circuit 704 for realizing the current sink $I_{CS}$ for absorbing electrical energy from the external circuit 102B of FIG. 1B, similar to the manner of which the current source is realised as shown in FIG. 2. In FIG. 7, the variable voltage converter 702 is used to convert the energy from the external circuit 102B to a source $v_{dc}$ or a resistance R. The sink current $i_x$ is regulated by controlling the output voltage of the variable voltage converter 702.

With reference to FIG. 7, in operation, the control circuit 704 first senses the sink current $i_x$ using a current detector 706 and then generates and outputs necessary command/signal to the variable voltage converter 702 to deliver required voltage. Specifically, if the sink current $i_x$ is lower than the designed sink current, the control circuit 704 will give command to the variable voltage converter 702 to deliver a higher output current to $v_{dc}$ or R, in order to increase the sink current $i_x$. Conversely, if the sink current $i_x$ is higher than the designed/predetermined sink current, the control circuit 704 will give command to the variable voltage converter 702 to deliver a lower output current to the source $v_{dc}$ or the resistor R, in order to reduce the sink current $i_x$.

Similar to the implementation of the current source, two major approaches are operable to implement the variable voltage converter 702 as shown in FIG. 7. The first approach is by using a series pass device and the second approach is based on using a switched-mode voltage converter to control the sink current $i_x$ from the external circuit.

Figure 8:
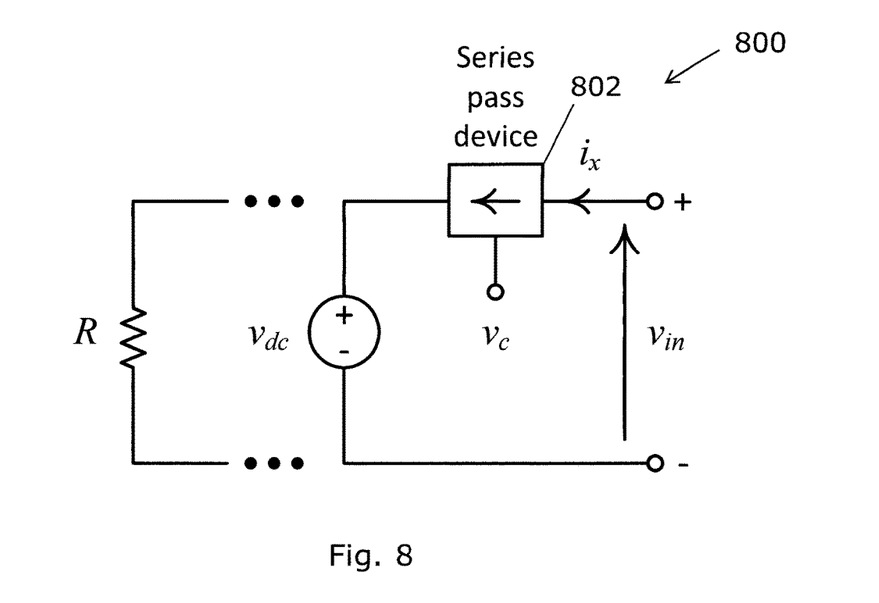
FIG. 8 is a circuit diagram showing a series pass device for implementing the current regulator of FIG. 7.

FIG. 8 shows a series pass device 802 for implementing the current regulator 700 of FIG. 7. Specifically, the series pass device 802 is used to control the magnitude of the current out of the connected circuit (from the external circuit to the source $v_{dc}$ or the resistor R). As shown in FIG. 8, the current $i_x$ through the series pass device 802 is controlled by a control signal $v_c$.

Figure 9:
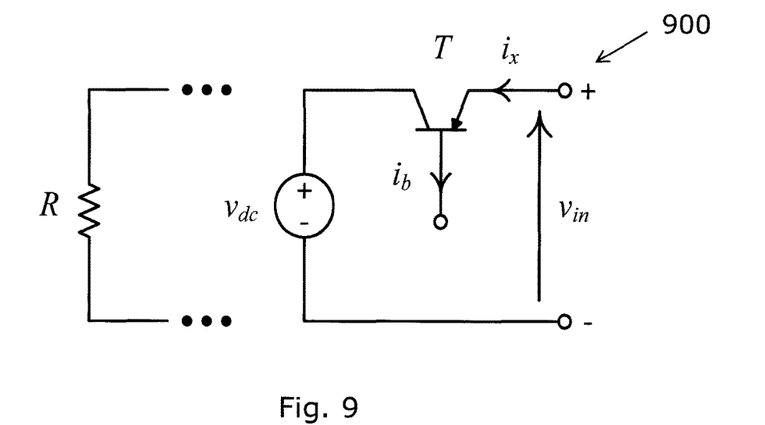
FIG. 9 is a circuit diagram showing the use of a bipolar junction transistor as the series pass device in FIG. 8.

FIG. 9 shows a bipolar junction transistor (BJT) T used as an exemplary series pass device 802 of FIG. 8 for controlling the magnitude of the current $i_x$ supplying to the source $v_{dc}$ or the resistor R. With reference to FIG. 9, in operation, by controlling the base current $i_b$ of the bipolar junction transistor T, the collector current of the bipolar junction transistor T and thus the sink current can be controlled in the circuit 900.

In particular, in order to ensure that there is current flowing from the electric circuit to the load (which may be the source $v_{dc}$ or the resistor R), the following conditions must be satisfied.

If the load is the source $v_{dc}$, the condition that needs to be satisfied is:

$$v_{in} > v_{dc} \quad \text{(Equation 5)}$$

If the load is the resistor R, the condition that needs to be satisfied is:

$$v_{in} > i_x R \quad \text{(Equation 6)}$$

The major disadvantage of using a series pass device in the current regulator 900 for a current sink as shown in FIG. 9 is that the energy taken from the external circuit will be dissipated as heat. For example, if the load is the source $v_{dc}$, the power dissipated $P_T$ in the transistor T is given by:

$$P_T = (v_x - v_{dc}) i_x \quad \text{(Equation 7)}$$

Alternatively, if the load is the resistor R, all energy taken from the external circuit will be dissipated as heat.
Essentially, the total power loss $P_{loss}$ is given by:

$$P_{loss} = v_{in} i_x \quad \text{(Equation 8)}$$

The power loss in the resistor $P_R$ and the power loss in the bipolar junction transistor $P_T$ are given by:

$$P_R = i_x^2 R \quad \text{(Equation 9)}$$

$$P_T = (v_{in} - i_x R) i_x \quad \text{(Equation 10)}$$

Figure 10:
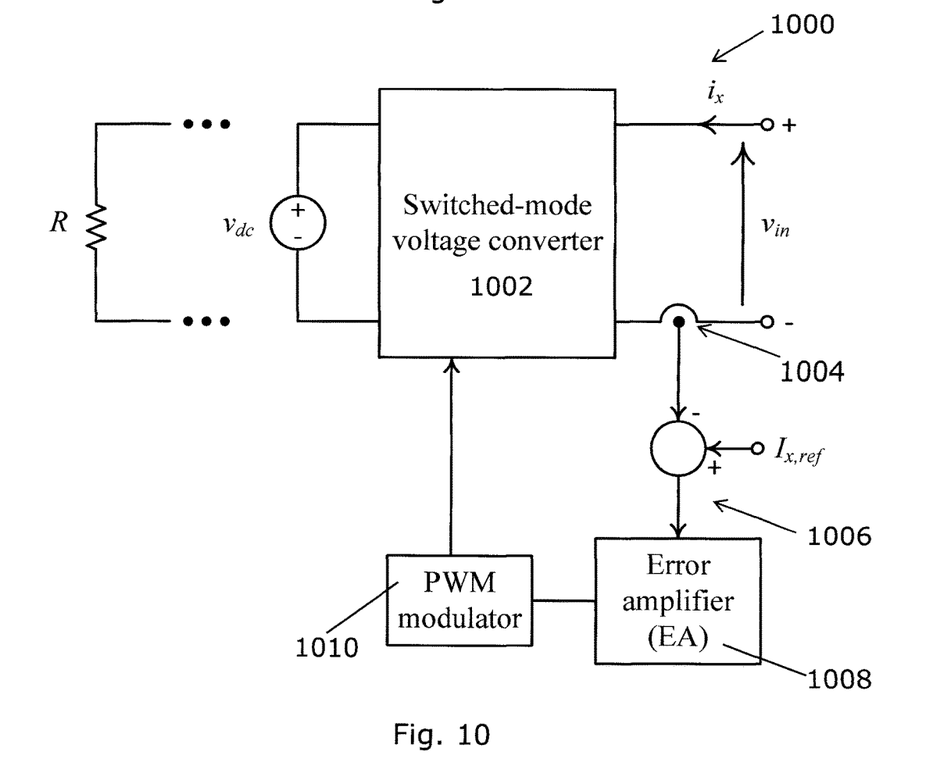
FIG. 10 is a circuit diagram showing a switched-mode voltage converter and its associated control circuit for realizing the current sink $I_{CS}$ of FIG. 1B.

FIG. 10 shows a switched-mode voltage converter 1002 and its associated control circuit for realizing the current sink $I_{CS}$ of FIG. 1B. As illustrated in FIG. 10, in operation, the output current $i_x$ is firstly sensed by a current-sensing device 1004 and is then compared with the reference current value $I_{x,ref}$ by a comparator 1006. The error, which is the difference between the sensed current $i_x$ and reference current value $I_{x,ref}$, is fed to an error amplifier EA 1008. The output of the error amplifier EA 1008 is then sent to a pulse-width modulation (PWM) modulator 1010 that generates and outputs the necessary command/signal to the switching devices in the power supply (switched-mode voltage converter 1002) to alter/manipulate the control parameters such as the duty cycle or switching frequency, so as to change the output current $i_x$ of the power supply. Accordingly, the sink current $i_x$ is effectively controlled.

As shown in FIGS. 11-14, there is provided various embodiments of a current control apparatus arranged to regulate an electric current flowing between a load and an external electric circuit, comprising: a current control loop having a current regulator arranged to manipulate an amount of the electric current flowing between the load and the external electric circuit; and a voltage control loop having a voltage regulator arranged to manipulate a voltage across the current regulator. Preferably, the voltage control loop is arranged to manipulate the voltage across the current regulator so as to minimize the voltage across the current regulator.

Figure 11:
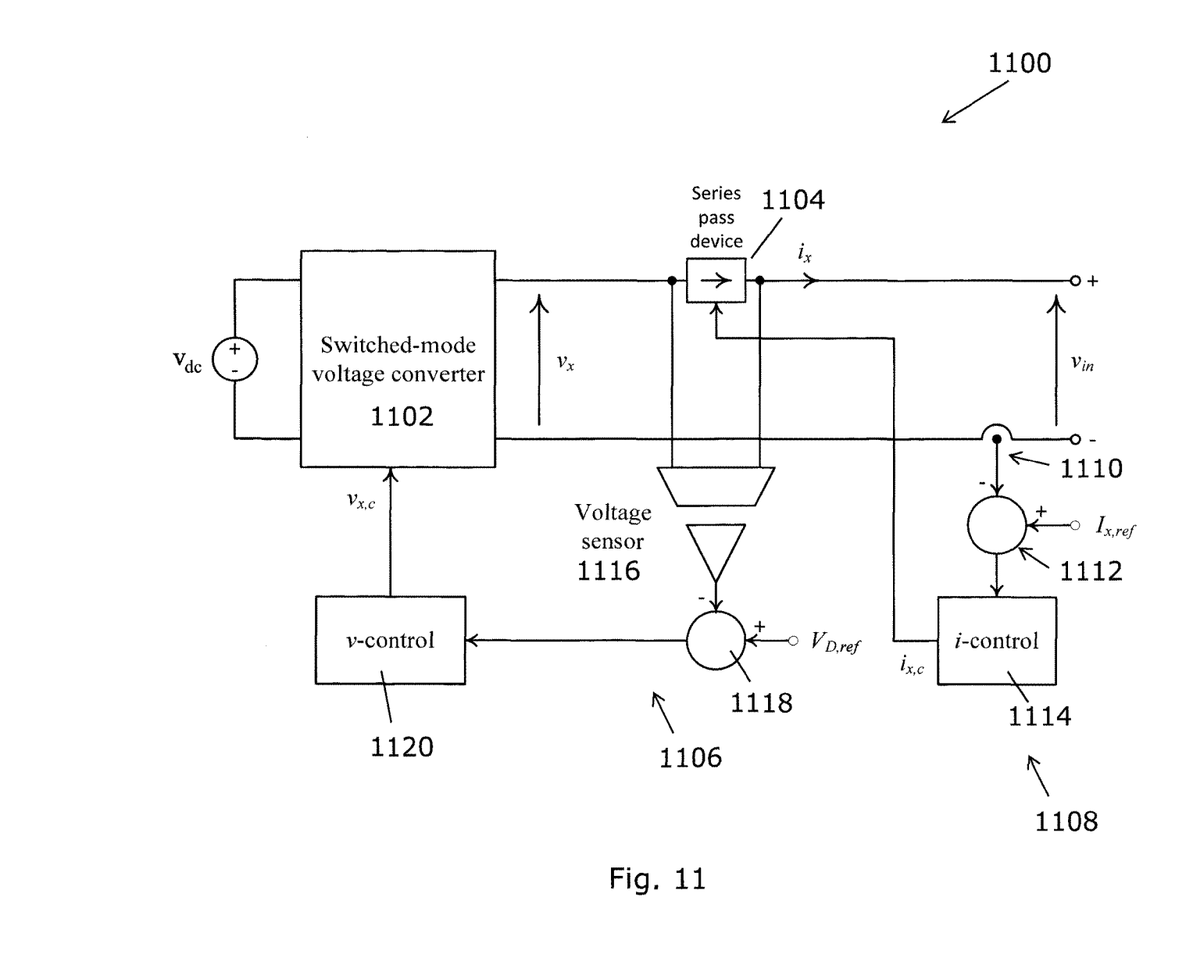
FIG. 11 is a circuit diagram showing a hybrid structure with a switched-mode voltage converter, a series pass device and their associated control circuits that are used as a current regulator for realizing a current source in accordance with one embodiment of the present invention.

FIG. 11 shows a circuit diagram 1100 illustrating a hybrid structure with a switched-mode voltage converter 1102, a series pass device 1104 and their associated control circuits (loops) 1106, 1108 that are used as a current regulator for realizing a current source in accordance with one embodiment of the present invention. With reference to FIG. 11, the circuit structure consists of a series pass device 1104 and a switched-mode voltage converter 1102 powered by a source $v_{dc}$. Specifically, the series pass device 1104 is used to regulate the magnitude of the current $i_x$, with a similar operation principle to that described with respect to FIG. 6. In FIG. 11, the current $i_x$ is first sensed by a current sensor 1110 and is then compared with a reference current $I_{x,ref}$ using a comparator 1112. The difference between the sensed current $i_x$ and the reference current is processed by a current controller "i-control" 1114 to generate a control signal $i_{x,c}$ for the series pass device 1104 to control the current $i_x$.

In order to reduce the power dissipation in the series pass device 1104 of FIG. 11, the voltage across the series pass device 1104 is regulated at the minimum value such that the current value of the series pass device 1104 can still be under the control of control signal $i_{x,c}$. In other words, if the series pass device 1104 is a bipolar junction transistor, the collector-emitter voltage is regulated at the voltage just slightly before saturation. In operation, the control mechanism 1106 in FIG. 11 is based on firstly sensing the voltage across the series pass device 1104 by using a voltage sensor 1116. Then, the sensed voltage is compared with a reference voltage $V_{D,ref}$ using a comparator 1118. In a preferred embodiment, the reference voltage $V_{D,ref}$ is zero but in another embodiment, the voltage is about 0.4V for a bipolar junction transistor. The voltage difference between the sensed voltage and the reference voltage $V_{D,ref}$ is then processed by a voltage controller "v-control" 1120 to generate a control signal $v_{x,c}$ for controlling the output voltage $v_x$ of the switched-mode voltage converter 1102. Preferably, the magnitude of the output voltage $v_x$ is equal to the voltage $v_{in}$ of the external circuit.

Figure 12:
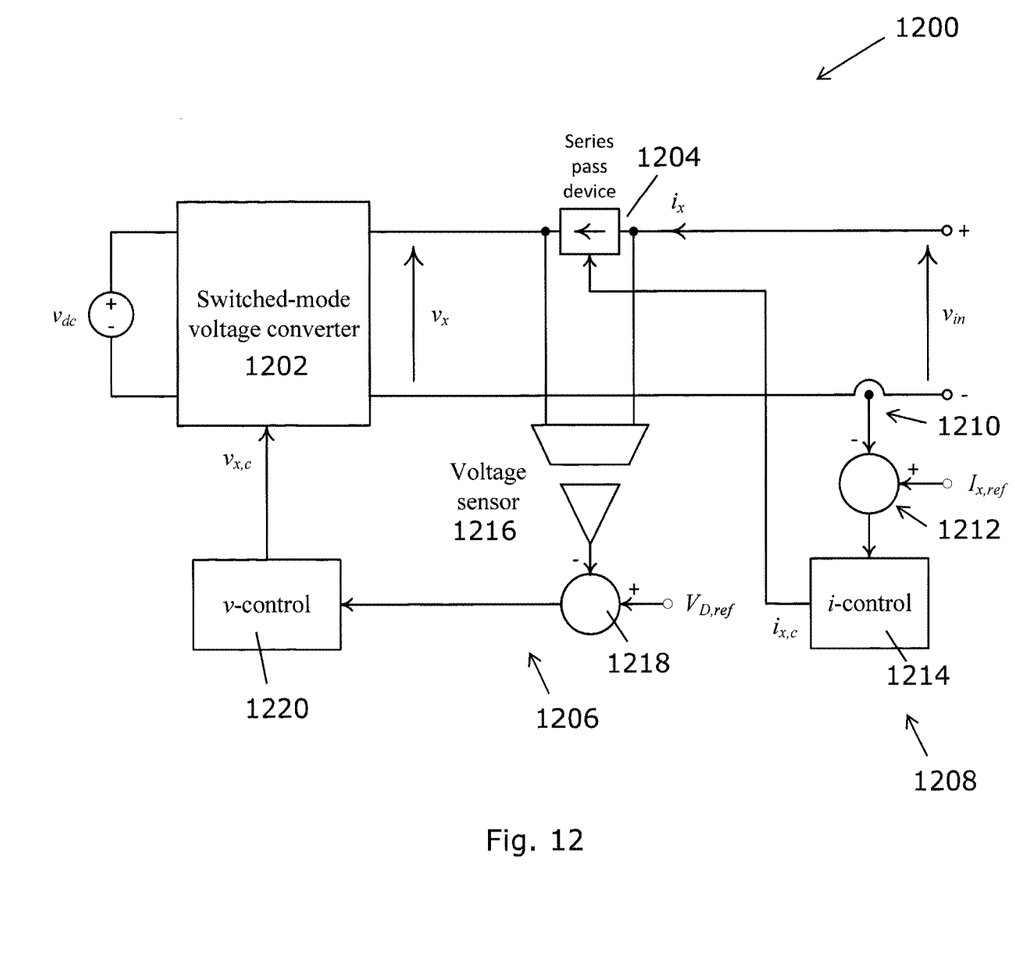
FIG. 12 is a circuit diagram showing a hybrid structure with a switched-mode voltage converter, a series pass device and their associated control circuits used as a current regulator for realizing a current sink in accordance with one embodiment of the present invention.

FIG. 12 shows a circuit diagram 1200 illustrating a hybrid structure with a switched-mode voltage converter 1202, a series pass device 1204 and their associated control circuits 1206, 1208 used as a current regulator for realizing a current sink in accordance with one embodiment of the present invention. Specifically, the source $v_{dc}$ is used to absorb energy from the external circuit.

The basic operation principle of the current sink 1200 in FIG. 12 is similar to the operation principle of the current source 1100 in FIG. 11, as described below. In the present embodiment, the current $i_x$ is firstly sensed by a current sensor 1210 and is then compared with a current reference $I_{x,ref}$ using a comparator 1212. Such current difference is processed a controller "i-control" 1214 to generate a control signal $i_{x,c}$ for the series pass device 1204 to control the current $i_x$.

To reduce the power dissipation in the series pass device 1204 in FIG. 12, the voltage across the series pass device 1204 is regulated at the minimum value such that the current value of the series pass device 1204 can still be under the control of $i_{x,c}$. In operation of the present embodiment, the voltage across the series pass device 1204 in FIG. 12 is sensed by a voltage sensor 1216. Then, the voltage will be compared with a reference voltage $V_{D,ref}$ using a comparator 1218. The voltage difference between the sensed voltage and the reference voltage $V_{D,ref}$ is then processed by a voltage controller "v-control" 1220 to generate a control signal $v_{x,c}$ to control the terminal voltage $v_x$ of the switched-mode voltage converter 1202. Preferably, the magnitude of the terminal voltage $v_x$ of the switched-mode voltage converter 1202 is equal to the voltage $v_{in}$ of the external circuit. In the present embodiment, the output of the switched-mode voltage converter 1202 is operable to transfer energy to the source $v_{dc}$.

Figure 13:
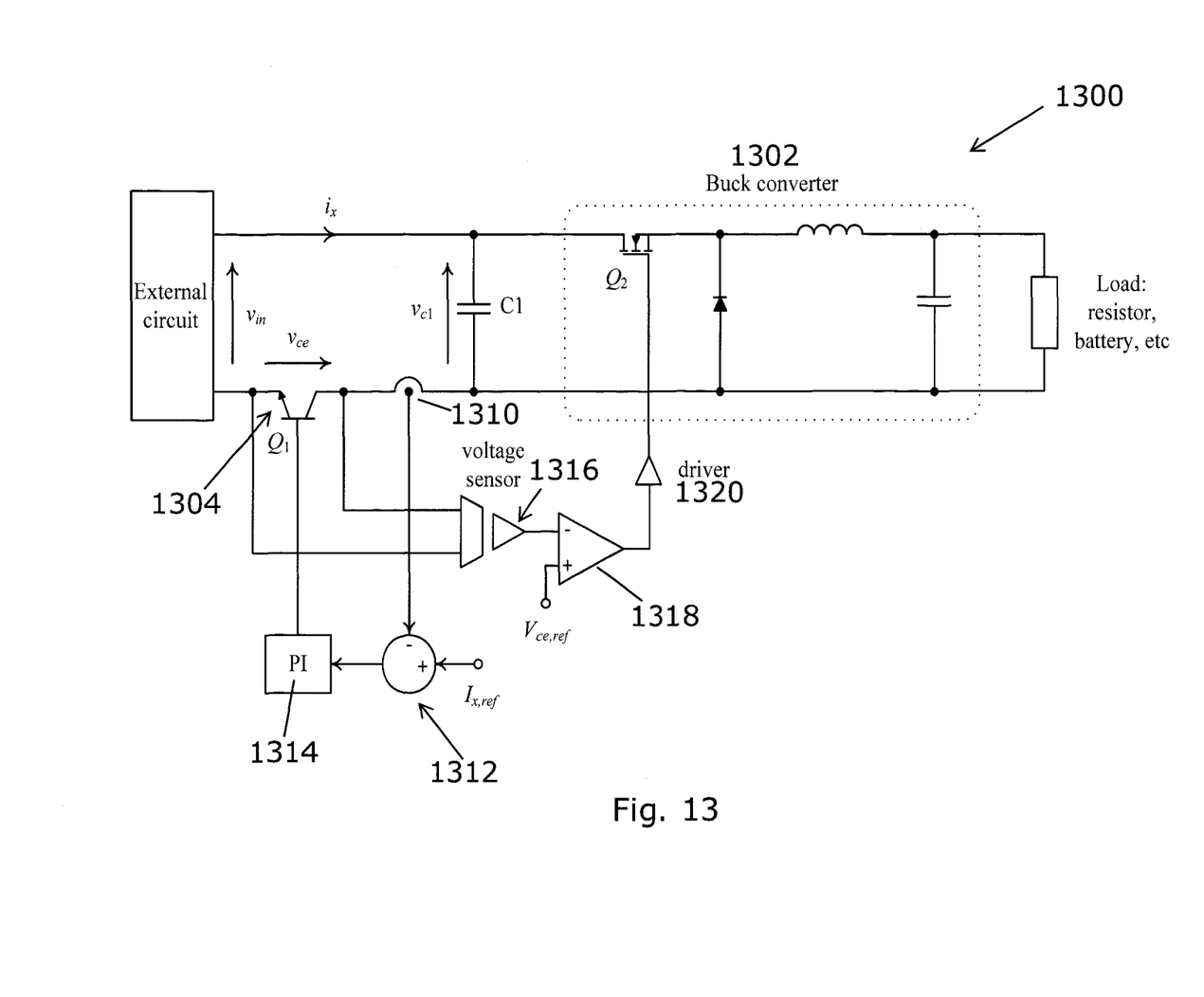
FIG. 13 is a circuit diagram showing a detailed circuit construction of FIG. 12 in accordance with one embodiment of the present invention, with a buck converter being used as the switched-mode voltage converter, and a bipolar junction device being used as the series pass device.

FIG. 13 is a circuit diagram 1300 showing a detailed circuit construction of FIG. 12 in accordance with one embodiment of the present invention. In this embodiment, a buck converter 1302 is used as the switched-mode voltage converter, and a bipolar junction device 1304 is used as the series pass device. The circuit 1300 in FIG. 13 includes two control loops, which includes, a control loop (v-control) used to regulate the voltage between the collector and emitter ($v_{ce}$) of the bipolar junction transistor 1304 to minimize the loss due to the series pass device 1304; and another control loop (i-control) with a proportional-plus-integral (PI) control 1314 arranged to regulate the output current at a required value by controlling the base current of the bipolar junction transistor 1304 (i.e. controlling the input current).

The v-control control loop is now described in further detail. In FIG. 13, the switching action of the buck converter 1302 is based on the v-control control loop and the following relationship, $$v_{in}=v_{ce}+v_{C1}$$ (Equation 11)

In operation, when the voltage between the collector and emitter of the bipolar junction transistor 1304 $v_{ce}$ is lower than the reference voltage $V_{ce,ref}$, the voltage across the capacitor C1 is high. Accordingly, a comparator 1318 will generate a signal to turn on MOSFET $Q_2$. When the MOSFET $Q_2$ is on, energy will be transferred from the input (external circuit) to the output (load). Thus, the voltage across C1 will reduce. Conversely, if the voltage between the collector and emitter of the bipolar junction transistor 1304 $v_{ce}$ is higher than the reference voltage $V_{ce,ref}$, the voltage across the capacitor C1 is low. Accordingly, the comparator 1318 will generate a signal to turn off MOSFET $Q_2$. When the MOSFET $Q_2$ is off, energy will be transferred from the input to C1. Accordingly, the voltage across C1 will increase.

The control method in the present embodiment is a simple hysteretic control. The switching frequency is dependent on some factors, such as the propagation delay of the entire feedback loop, operating point of the system, etc. However, a person skilled in the art would appreciate that the hysteretic control is merely exemplary and variations are possible without deviating from the spirit of the present invention. No matter which type of control method is used, the major objective of the control loop in the present invention is to keep the voltage across the series-pass device small, so as to reduce the power dissipation in the series-pass device.

The i-control control loop is now described in further detail. In FIG. 13, the output current can be controlled by using a simple proportional-plus-integral (PI) control 1314. The output current is sensed by a current detector 1310 and compared with a reference current value using a comparator 1312. If the sink current is lower than the current reference $I_{x,ref}$, the PI controller 1314 will generate a bias current to the bipolar junction transistor 1304, and vice versa.

In the present embodiment, the output of the buck converter 1302 is connected to a load, which may for example include a resistor or a battery. If the load is a resistor, the energy absorbed from the external circuit will be dissipated as heat; whereas if the load is a battery, the energy absorbed from the external circuit will be stored in the battery.

In the embodiments of the circuits 1200, 1300 as shown in FIGS. 12 and 13, the energy flow is unidirectional, that is, electric energy can only be transferred from the source $v_{dc}$ to the external circuit $v_{in}$, or from the external circuit $v_{in}$ to the source $v_{dc}$.

Figure 14:
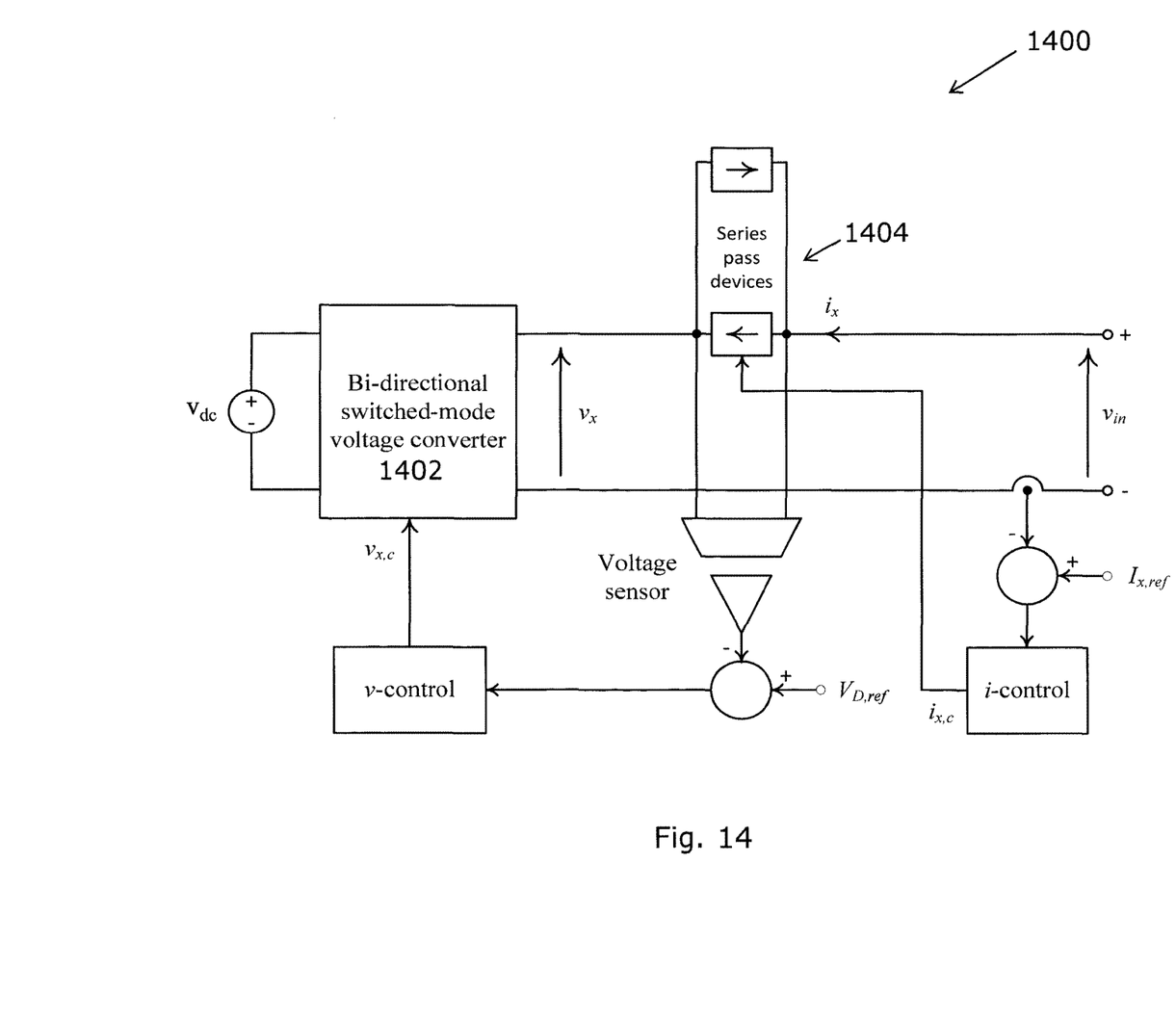
FIG. 14 is a circuit diagram showing an integrated current source and current sink in accordance with one embodiment of the present invention.

FIG. 14 shows a circuit diagram 1400 illustrating an integrated current source and current sink in accordance with one embodiment of the present invention. The circuit 1400 in FIG. 14 is adapted to enable bi-directional energy flow. Specifically, the circuit 1400 comprises a series pass device 1404 that allows bi-directional current flow. In this embodiment, the series pass device 1404 is implemented by using two unidirectional series pass device connected in an anti-parallel manner. The series pass device may be, for example, bipolar junction transistors. In addition, the switched-mode converter 1402 in FIG. 14 is arranged to allow bidirectional power flow. Thus, energy can be transferred from the source $v_{dc}$ (or a load R) to the external circuit; or from the external circuit to the source $v_{dc}$ (or a load R). The control mechanism of the circuit in FIG. 14 is the same as the operations of the current source or current sink described with respect to FIG. 12 or 13, and thus will not be exhaustively described.

The present invention provides a current control apparatus operable as a current source or a current sink or both, by hybridizing a linear-pass device and a switching-mode converter. Particularly, various embodiments of the current control apparatus in the present invention are operable to regulate current between the current source and the electric circuit, by providing high dynamic response, low noise, and high energy efficient current control, which is not achievable by using a linear-pass device or a switching-mode converter alone.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A current control circuit arranged to regulate bi-directional current flow between a load and an external electric circuit, comprising:
a series-pass device formed by
a first series-pass device arranged to enable current flow from the load to the external electric circuit; and
a second series-pass device connected in parallel with the first series-pass device, arranged to enable current flow from the external electric circuit to the load;
a bi-directional switched mode voltage converter;
a current feedback circuit, comprising:
a current detector arranged to detect the electric current flowing between the load and the external electric circuit; and
a current controller arranged to compare the detected electric current with a predetermined current value and generate a control signal for controlling the series-pass device so as to manipulate the electric current; and
a voltage feedback circuit, comprising:
a voltage sensor arranged to detect a voltage directly across the series-pass device; and
a voltage controller arranged to compare the detected voltage with a predetermined voltage value for controlling an output voltage of the bi-directional switched mode voltage converter so as to regulate the voltage across the series-pass device;
wherein the voltage across the series-pass device is regulated to be at a value such that the series-pass device can be controlled by the control signal.

2. The current control circuit in accordance with claim 1, wherein the current controller is arranged to substantially match the electric current to the predetermined current value.

3. The current control circuit in accordance with claim 1, wherein the voltage controller is arranged to substantially match the voltage across the series-pass device to the predetermined voltage value.

4. The current control circuit in accordance with claim 1, wherein the output voltage of the bi-directional switched mode voltage converter is controlled to be substantially matched to a voltage across the external electric circuit.

5. The current control circuit in accordance with claim 1, wherein the first series-pass device comprises a first bipolar junction transistor and the second series-pass device comprises a second bipolar junction transistor.

6. The current control circuit in accordance with claim 5, wherein the electric current is a collector current of one of the first bipolar junction transistor and the second bipolar junction transistor.

7. The current control circuit in accordance with claim 6, wherein the current controller is arranged to control a base current of the corresponding bipolar junction transistor so as to manipulate the collector current of the corresponding bipolar junction transistor.

8. The current control circuit in accordance with claim 5, wherein the voltage across the series-pass device is a collector-emitter voltage of one of the first bipolar junction transistor and the second bipolar junction transistor.

9. The current control circuit in accordance with claim 1, wherein the current controller comprises a proportional-plus-integral (PI) controller.

10. The current control circuit in accordance with claim 1, wherein the load comprises a power source or a resistive component.

11. The current control circuit in accordance with claim 1, wherein the current feedback circuit is in the form of a loop.

12. The current control circuit in accordance with claim 1, wherein the voltage feedback circuit is in the form of a loop.

* * * * *